J. P. WRIGHT & C. A. CARLSON.
MACHINE FOR MAKING BOXES.
APPLICATION FILED JUNE 26, 1917.
1,293,288.
Patented Feb. 4, 1919.
9 SHEETS—SHEET 5.
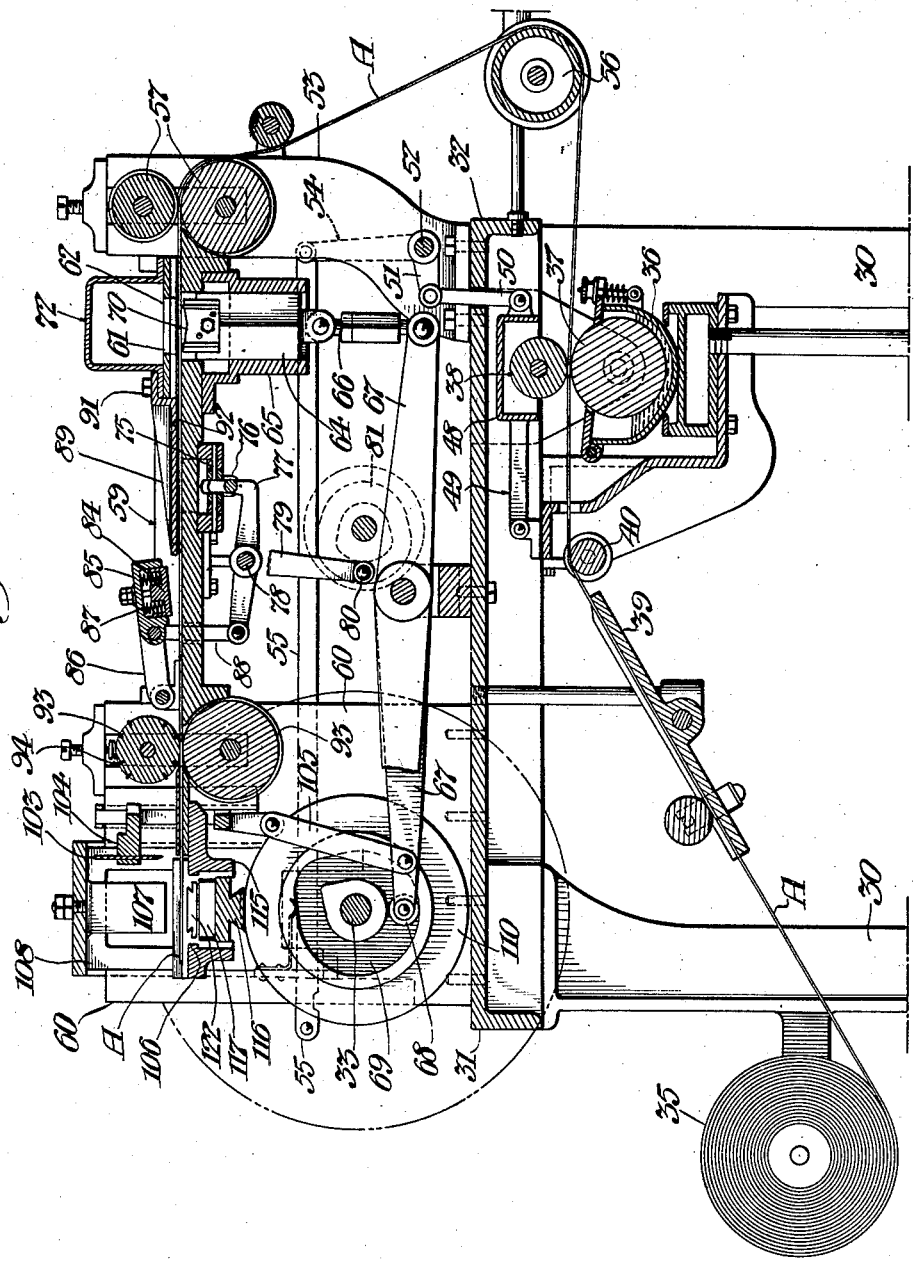
Inventors,
Jacob P. Wright
Carl A. Carlson
by their Attorney
John F. Nolan

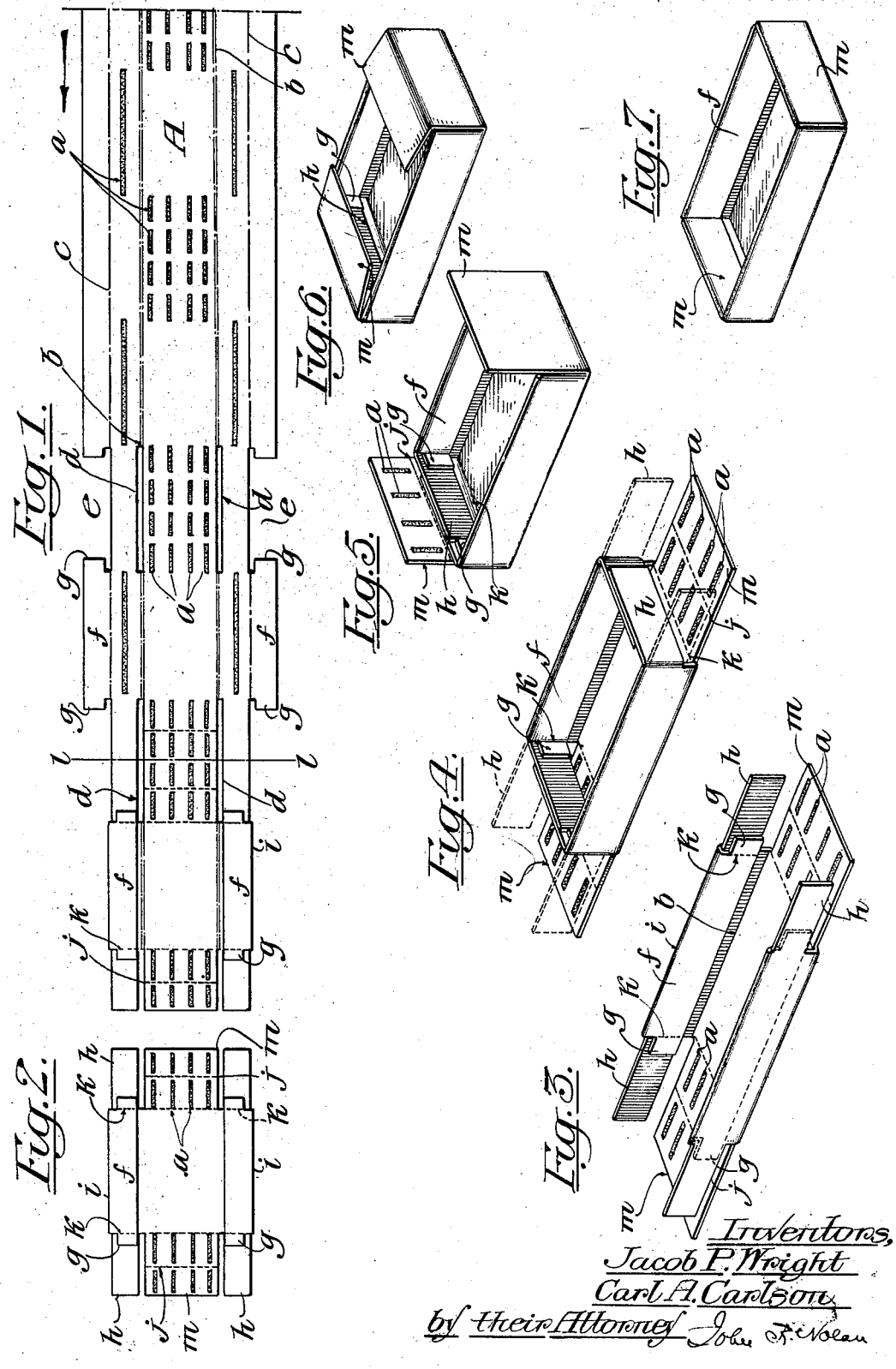

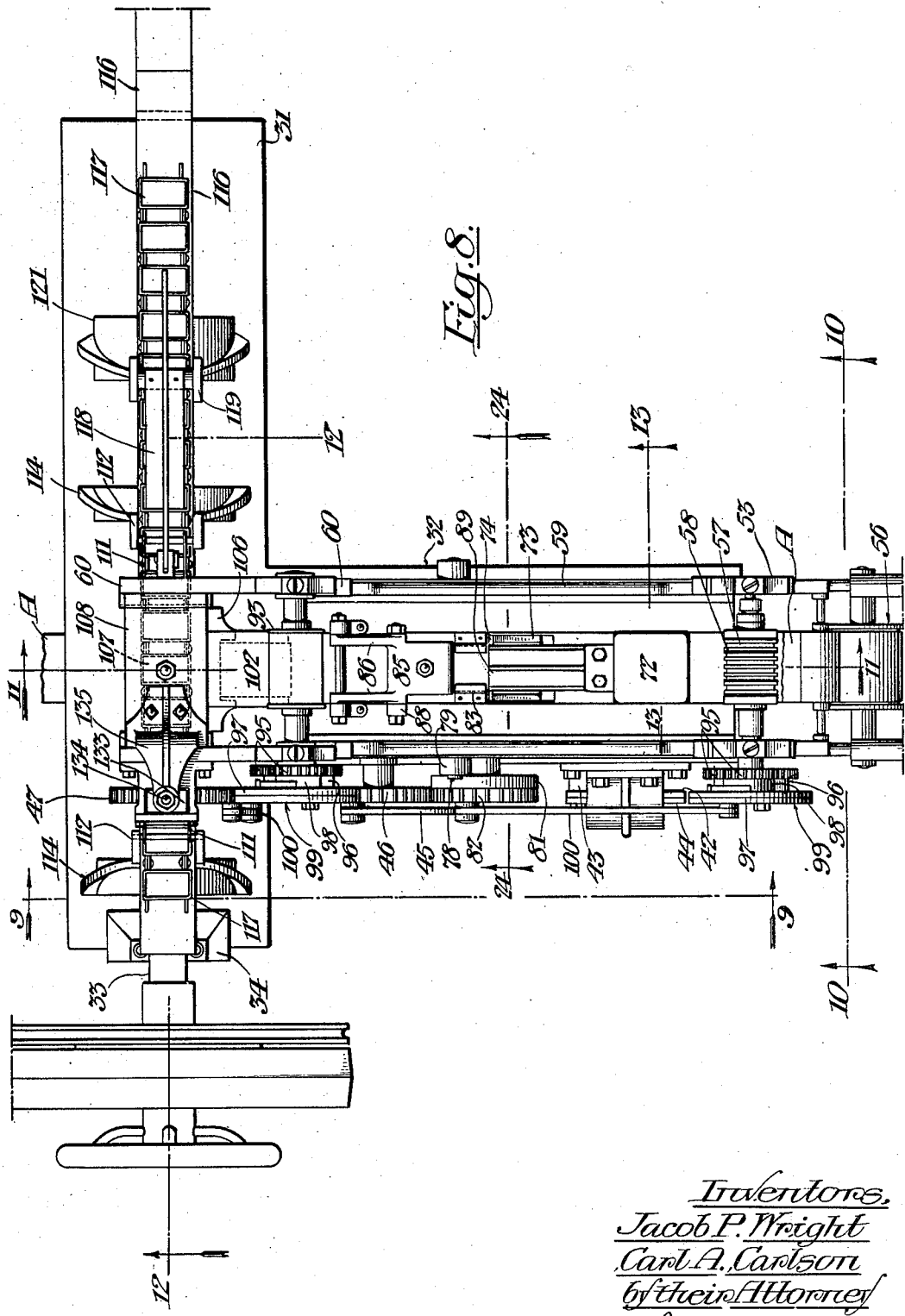

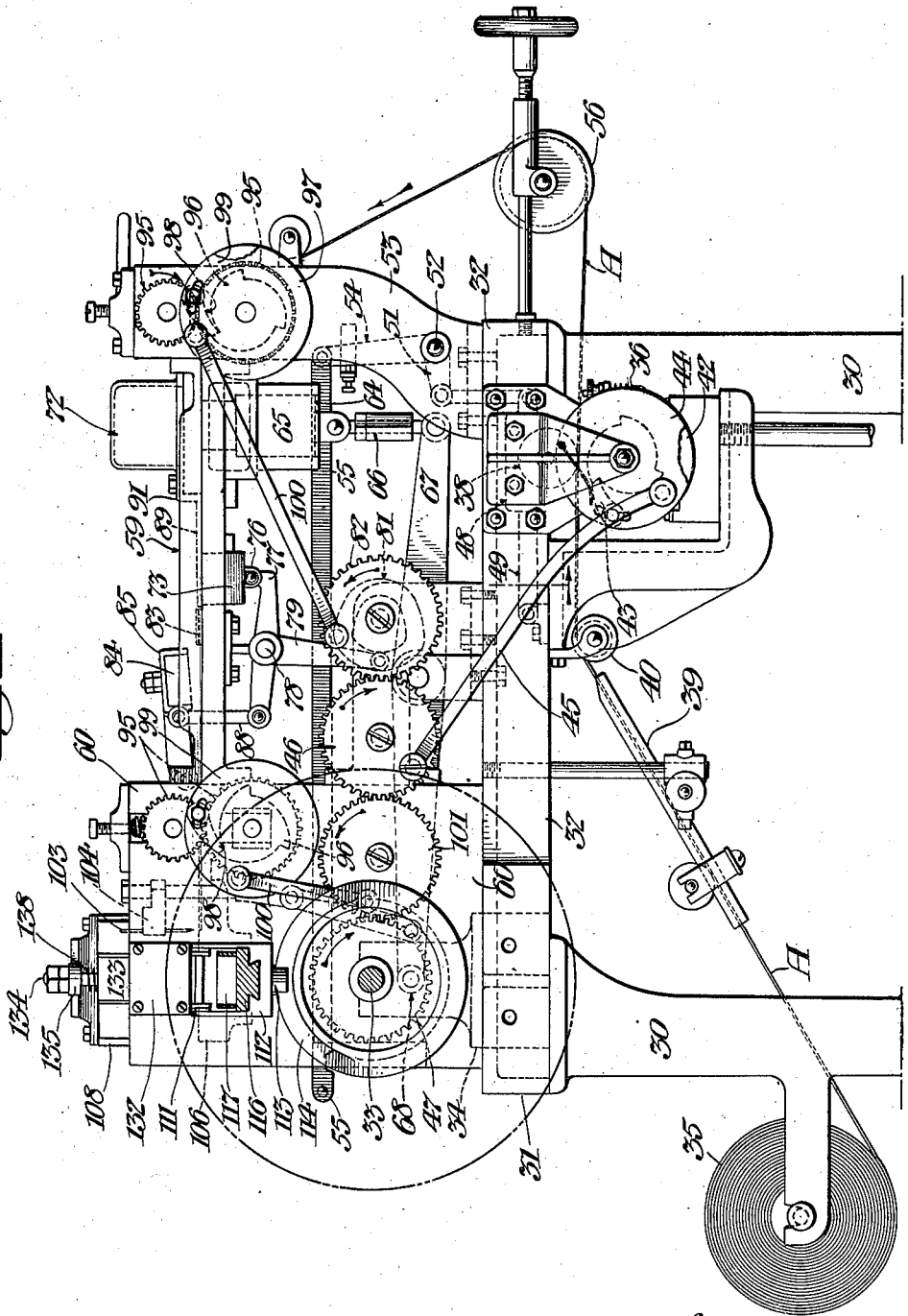

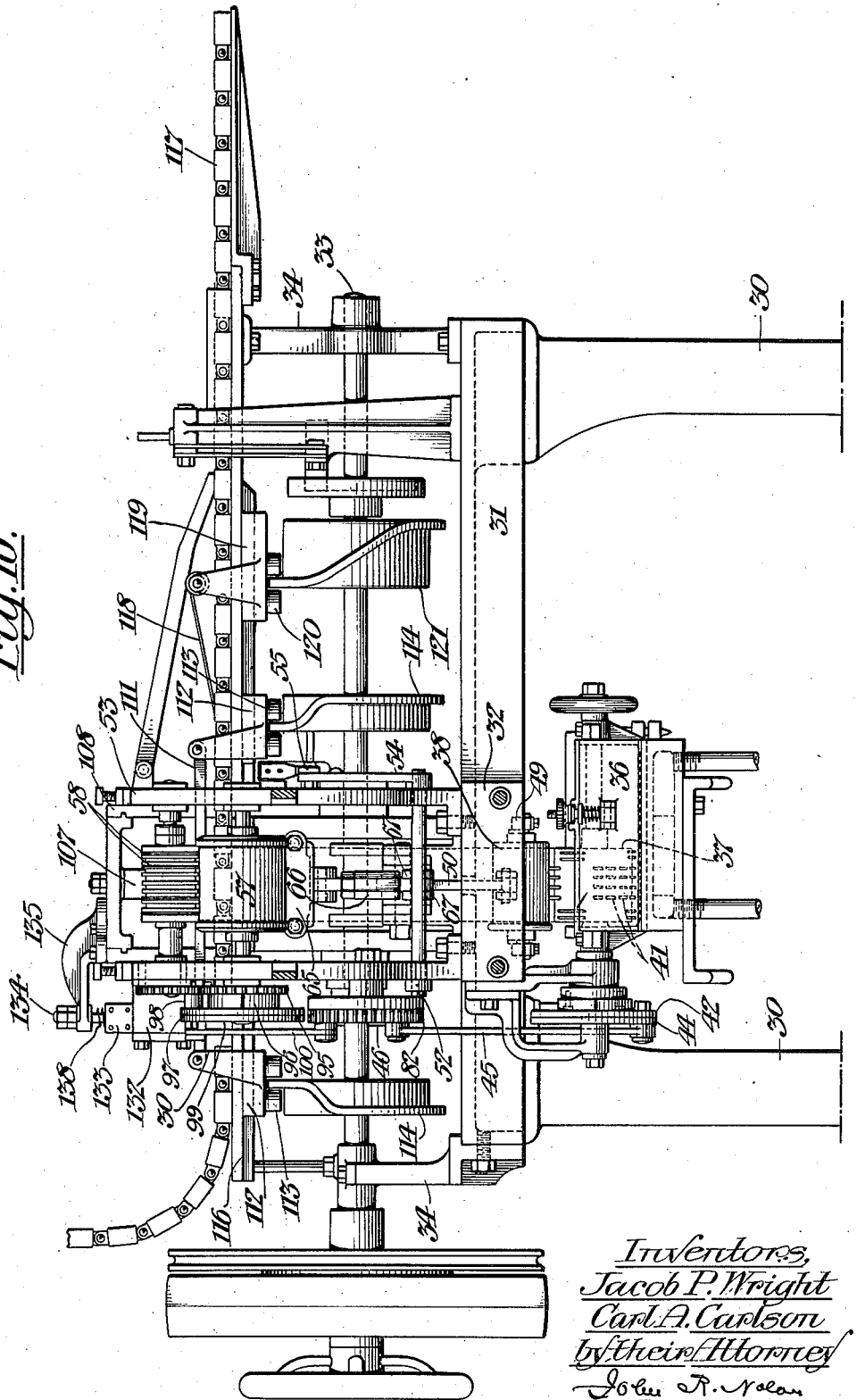

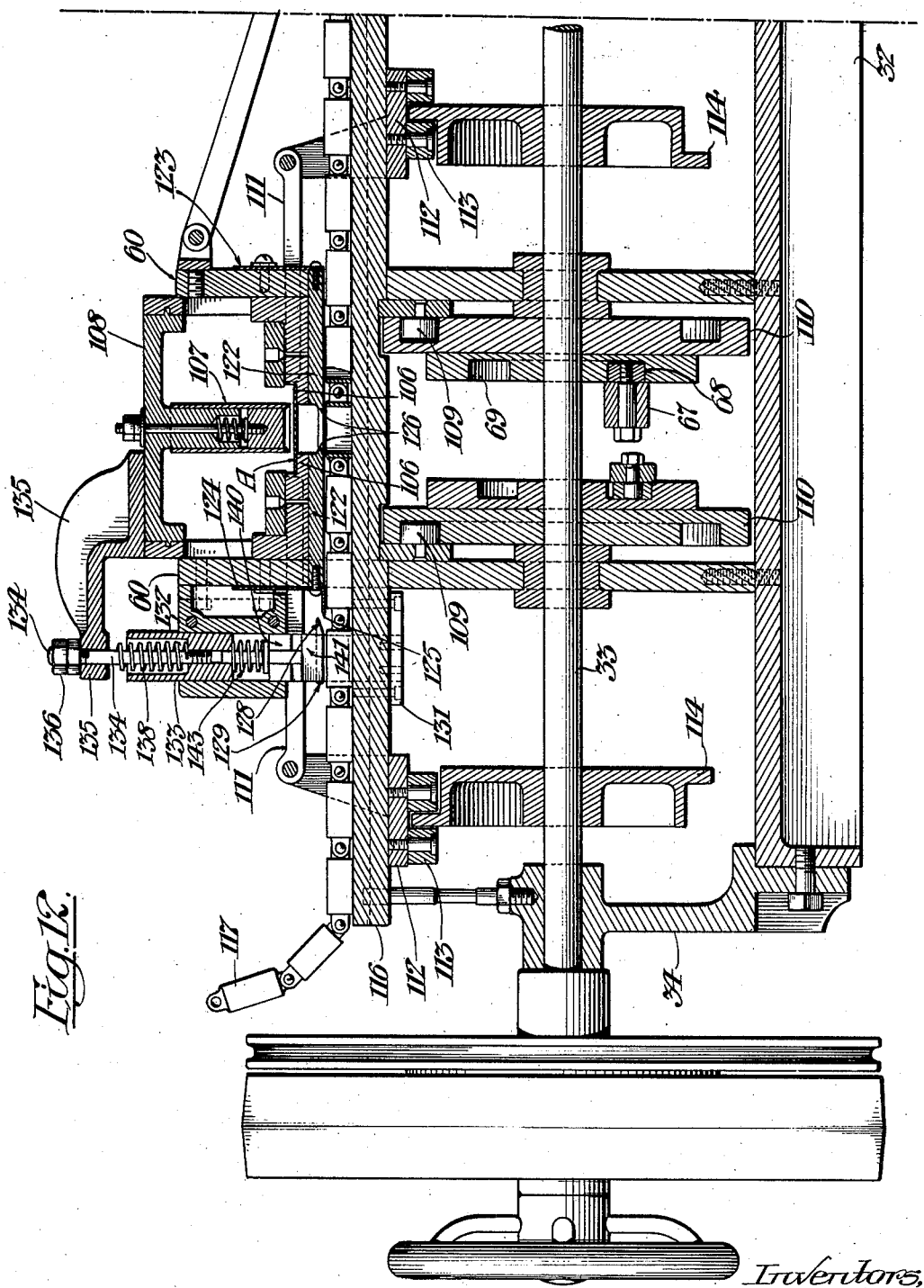

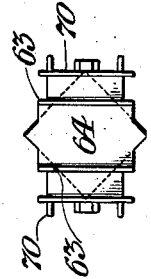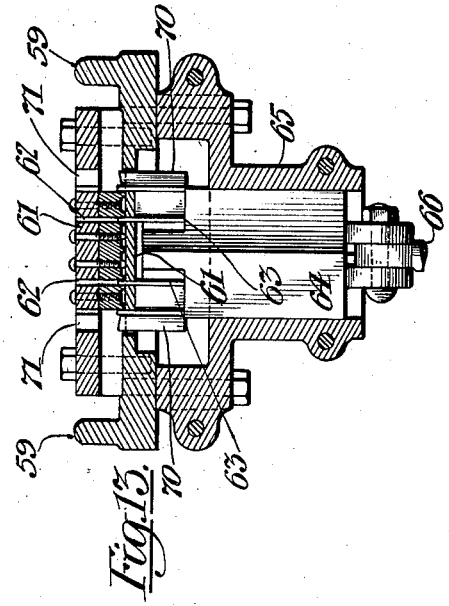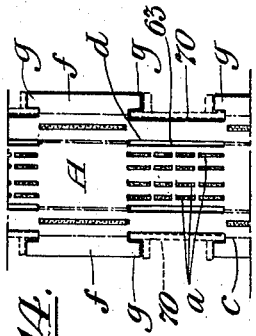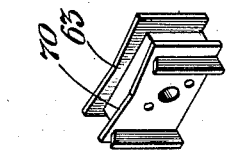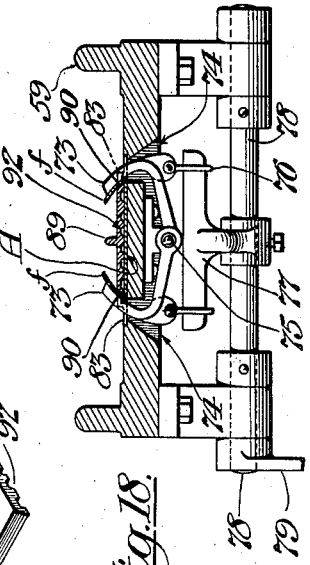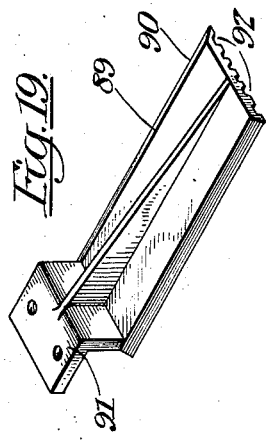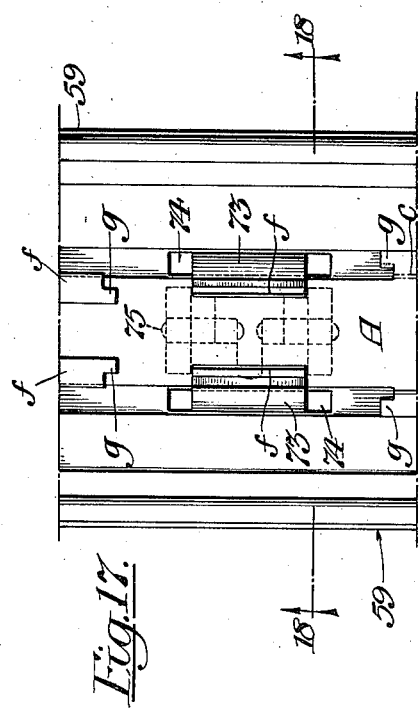

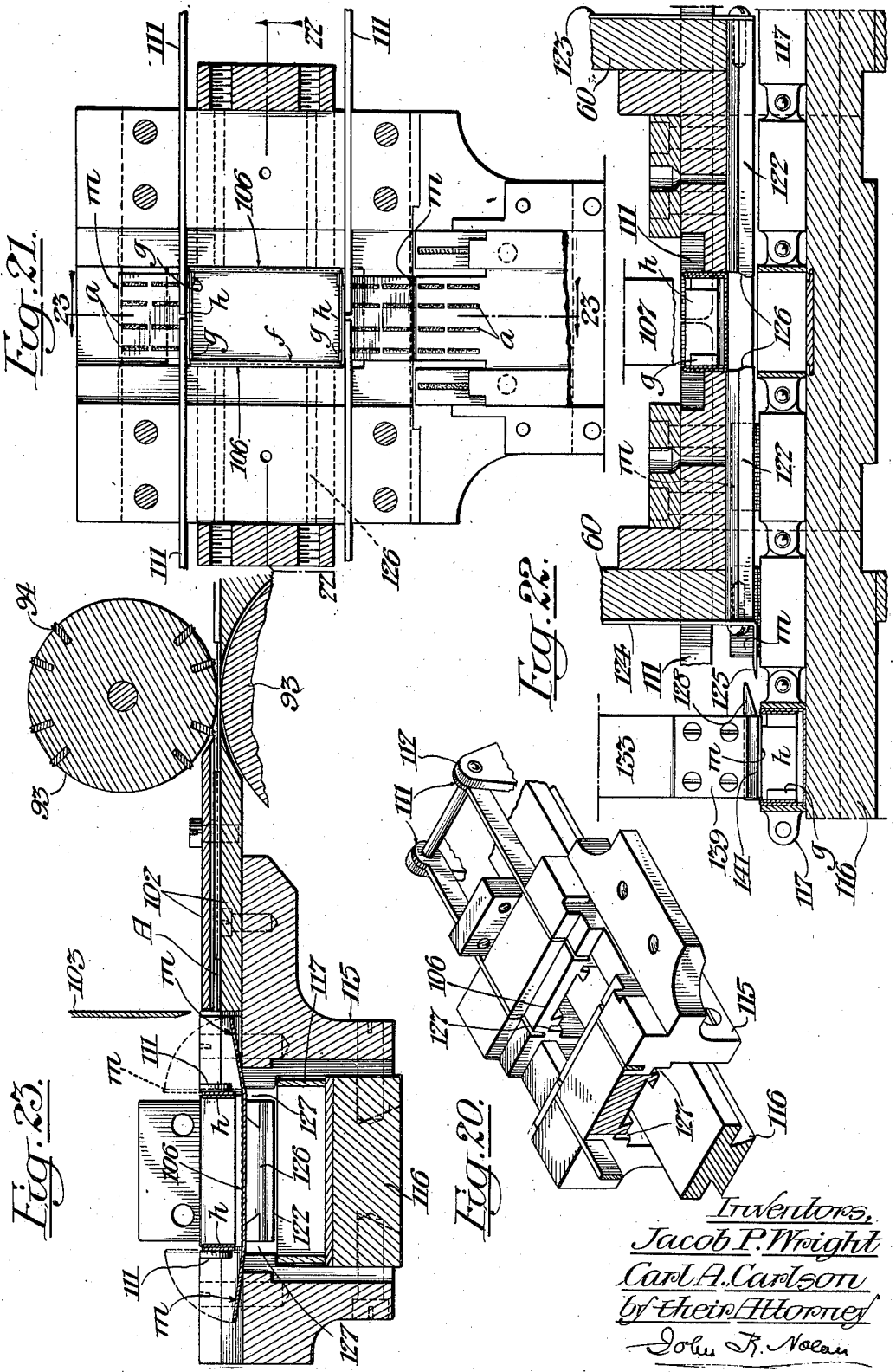

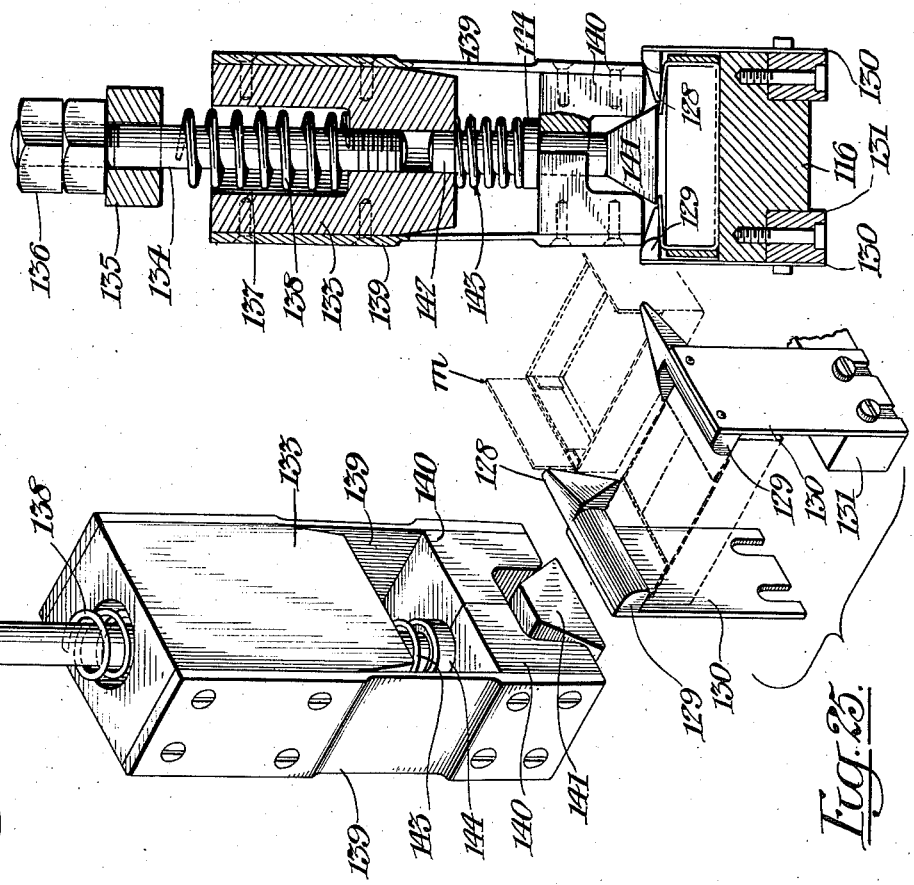

UNITED STATES PATENT OFFICE.

JACOB P. WRIGHT AND CARL A. CARLSON, OF BARBERTON, OHIO, ASSIGNORS TO THE DIAMOND MATCH COMPANY, OF CHICAGO, ILLINOIS, A CORPORATION OF ILLINOIS.

MACHINE FOR MAKING BOXES.

1,293,288.      Specification of Letters Patent.      Patented Feb. 4, 1919.

Application filed June 26, 1917. Serial No. 176,941.

*To all whom it may concern:*

Be it known that we, JACOB P. WRIGHT and CARL A. CARLSON, both citizens of the United States, and both residents of Barberton, in the county of Summit and State of Ohio, have invented certain new and useful Improvements in Machines for Making Boxes, of which the following is a specification.

This invention relates to machines for making boxes, and more especially to machines of that class whereby a strip of pasteboard, or similar box-stock, is progressively drawn from a roll and advanced through the box-making path, as illustrated in Letters Patent of the United States No. 554,975, dated February 18, 1896, to which reference may be had.

The object of our invention is to provide a machine of the class mentioned for the economic production of paper or pasteboard boxes having their walls reinforced and strengthened by inturned integral folds or extensions of the material of which the bodies of the boxes are composed.

The machine herein illustrated to embody our invention has been especially designed to produce a match-box tray having reinforced sides, ends and corners; such tray being adapted to be used with the usual shuck or cover. The particular construction of the box-tray and the sequential steps to which the strip-material is subjected for the production of the tray will hereinafter appear.

The invention, generally stated, comprises various novel features of construction and combinations of parts, including strip-feeding and scoring mechanisms; glue-applying mechanism; strip slitting and recessing mechanism; lap-folding mechanism; blank-cutting mechanism; and mechanism for converting succeeding blanks into boxes, all as will be hereinafter described and claimed.

In the drawings—

Figure 1 is a plan of a portion of a strip of box-stock which has been subjected to glue-applying, scoring, punching and side-folding operations preparatory to the severance of a box-blank from the body of the strip.

Fig. 2 is a plan of the severed blank.

Figs. 3, 4, 5 and 6 illustrate successive conditions of the blank during the box-forming operation.

Fig. 7 shows the finished box.

Fig. 8 is a plan of our improved box-making machine.

Fig. 9 is a transverse vertical section thereof, as on the line 9—9 of Fig. 8.

Fig. 10 is a sectional front elevation of the machine, as on the line 10—10 of Fig. 8.

Fig. 11 is a transverse vertical section of the same, as on the line 11—11 of Fig. 8.

Fig. 12 is a longitudinal vertical section, enlarged, as on the line 12—12 of Fig. 8.

Fig. 13 is a sectional elevation through the punch and die mechanism for the strip of box material, as on the line 13—13 of Fig. 8.

Fig. 14 is a plan of a part of the strip as it appears after the operation of the punch and die mechanism thereon.

Fig. 15 is a plan of the punch as detached.

Fig. 16 is a separate perspective view of one of the lateral cutter members of the punch.

Fig. 17 is a plan of a portion of the bed and the swinging arms for folding over the side reinforcing laps of the strip of box material after the action of the punch on the strip, a portion of said strip being shown and the folders being represented in their inward or folding position.

Fig. 18 is a vertical section, as on the line 18—18 of Fig. 17.

Fig. 19 is a detached perspective view of a beveled edged guide plate with which the swinging folding arms coöperate.

Fig. 20 is a detached perspective view, partly in section, of a stationary die-block and reciprocable end-folding fingers therein.

Fig. 21 is a plan of said die-block and adjuncts, showing a partially-formed box positioned in the block, the end-folding fingers being indicated in their inward position with the side extensions and corner tongues of the blank folded thereby.

Fig. 22 is a longitudinal vertical section, as on the line 22—22 of Fig. 21, showing, additionally, a portion of the chain, the box strippers, and the final folding mechanism.

Fig. 23 is a transverse vertical section, as on the line 23—23 of Fig. 21, showing, ad ditionally, the relation of the second scoring and feeding rolls and of the knife to the die-block.

Fig. 24 is a partial transverse vertical section, as on the line 24—24 of Fig. 8.

Fig. 25 is a perspective view of spaced cams for engaging and folding the up-projecting end laps of a partially-folded box blank, the latter being indicated in dotted lines in the respective positions occupied thereby preparatory to and after the operation of the cams upon said end laps.

Fig. 26 is a perspective view of the final folding plunger which coöperates with the stationary die-block.

Fig. 27 is a vertical section through said plunger and the underlying parts, as on the line 27—27 of Fig. 24.

Referring to Fig. 1 of the drawings, A indicates strip material equal in width to ordinary box stock, plus reinforcing side laps or folds, which strip is drawn from a suitable roll in the direction indicated by the arrow. As the strip progresses it is subjected to the following steps in the sequence indicated: The surface of the strip is supplied at predetermined intervals with lines or spots of glue, as at $a$. It is then longitudinally scored on parallel lines $b$, $c$ which respectively define the fold lines of the side walls of the box and of the reinforcing folds thereof. Longitudinal parallel slits, as $d$, and lateral offset or recessed portions as at $e$, are punched out of the strip to define the reinforcing side laps $f$, corner tongues, $g$, and end folds $h$ for succeeding boxes. The side laps, $f$, thus produced, are then folded inwardly upon and glued to the main side portions of the strip as indicated at $i$. The strip is then transversely scored on the lines $j$ and $k$ to provide fold lines for the end and corner portions of the box. The strip is then transversely severed midway between the ends of the succeeding side folds as on the line $l$, thus producing a box blank having two-ply side portions, end extensions $h$ from the side folds, and end extensions $m$ from the bottom, as shown in Fig. 2.

The two-ply side portions of the blank are then bent upward along the basal fold line $b$ as indicated in Fig. 3, and each pair of end extensions $h$ are then turned inwardly on the fold lines $k$, at right angles to the upstanding sides, so as to overlap, as shown in Fig. 4. The tongues $g$ being flexed by the inward folding of the end extensions reinforce the corners of the box. The bottom extensions $m$ are then turned upward on the fold lines $k$ as indicated in Fig. 5. The upper portions, rising above the inturned extensions $h$, are then turned inwardly on the fold lines $j$, as seen in Fig. 6, and folded down against the inner sides of the end extensions $h$ and the corner tongues, as seen in Fig. 7. At the same time the inturned side and end folds are pressed hard against the adjacent surfaces of the structure so as to insure the effective union of the contiguous parts.

Referring to the drawings illustrating the machine for producing the box above described, 30 designates the supporting frame structure, including a main table portion 31 having a rear extension 32 at right angles thereto; and 33 designates the main shaft journaled in suitable bearings in standards 34 on the main table portion.

35 designates a roll from which the strip, A, of paper or paste-board is drawn, which roll is mounted to rotate in suitably-disposed bearings on the supporting frame forwardly of the table.

36 designates a glue-pot located beneath the table extension at or near the rearward end thereof. Mounted to rotate in the glue-pot is a glue-applying roll 37 above which turns a pressure roller 38. The strip from the roll 35 is drawn between the glue-roller and the pressure roller, being guided thereto by a suitably-disposed bridge 39 and roller 40, as seen in Figs. 9 and 11. The periphery of the roll 37 is formed with appropriate projections 41 (Fig. 10) which apply the relatively spaced spots and lines of glue to the underside of the traveling strip. The glue-roll may be rotated by any suitable mechanism. In the present instance the shaft of the roll has fast thereon a ratchet disk 42 with which co-acts a pawl 43 carried by a crank disk 44 loose on the shaft. The latter disk is connected by means of a rod 45 with a crank wrist on a gear wheel 46 of a gear train in which is included a gear 47 on the main shaft 33. During the operation of the machine the crank disk and its pawl are oscillated by the reciprocations of the crank-rod, thereby intermittently rotating the ratchet wheel, and perforce the glue roll. The pressure roller 38 is journaled in a housing 48 which is carried by pivotally supported arms 49 so as to be movable toward and from the surface of the strip. The housing is connected by means of a link 50 with a crank-arm 51 fast on a rocker-shaft 52 which is journaled in standards 53 on the table extension. One end of this shaft is provided with an arm 54 to which is secured a suitable hand bar 55 by the manipulation of which the rock-shaft may be actuated in order to raise or lower the housing and thus accordingly dispose the pressure roller in relation to the strip.

The strip passes from the glue roll to and about a guide roller 56 at the rear of the table extension, thence upward to and between a pair of feeding and scoring rollers 57, the shafts of which have their bearings in boxes in the standards 53 on the table. The glue surface of the strip is uppermost as it passes to and from the feed rollers. The upper roller is provided with circumferential scoring knives 58 which are properly spaced to form the longitudinal score lines $b$, $c$ in the strip, and it is also provided with suitably-disposed circumferential grooves which afford clearance for the glue on the strip. (See Figs. 8, 10 and 11.)

The rollers 57 are intermittently rotated in timely relation to the glue roll in any suitable manner. The preferred means herein shown for actuating such rollers will be hereinafter described.

The strip passes from the feeding and scoring rollers 57 to and along a horizontal bed 59 supported by the standards 53 and by standards 60 rising from the table. On this bed adjacent the rollers 57 is a guide path formed between spaced die plates 61 the parallel die slots 62 of which are indicated in Fig. 13. Reciprocative through the die and across this path during each dwell of the strip in its intermittent travel, are upstanding blade punches 63 that form the longitudinal slits $d$ in the strip. The punches are carried by a plunger 64 which is slidingly fitted in a depending guide structure 65 on the bed, and is connected by means of a link 66 with one arm of a rocker lever 67, the other arm of which is provided with a roller 68 which runs in the race of a cam 69 on the main shaft. The top of the plunger 64 is equipped with lateral punches 70 which are appropriately formed and spaced to co-act with complementary die openings 71 in the plates 61 and thus produce concurrently with the slitting operation, the offset recesses $e$ in the box strip. The die is incased and protected by a cap 72 which is conveniently affixed thereto.

From the punch and die devices the strip passes to mechanism whereby the side laps $f$ are folded over upon the main side portions of the strip. This mechanism, in its preferred construction, includes a pair of vibratory folder arms 73 having inturned or hook-like portions which are movable through spaced longitudinal slots 74 in the bed 59 directly beneath the side laps. (See Figs. 17 and 18.) These arms are pivoted, as at 75, to a bracket on the underside of the bed and are flexibly connected by links 76 to the respective cross-limbs of a T-shaped rocker lever 77 carried by a transverse shaft 78 having its bearings in hangers on the bed. Fast on the rocker shaft is a depending arm 79 bearing at its lower end a roller 80 (Fig. 11) which runs in the race of a cam 81 fast on a gear 82 (Fig. 9) of the gear train above referred to. The contour of the cam race is such that when the strip is impelled to a position with the laps overlying the folders, the arm 79 is actuated so as to swing the said folders upward on their pivotal point and thus raise and inwardly deflect the side laps $f$ as illustrated in Fig. 18. Secured to the bed, adjacent the first folders 73, are spaced cam bars 83 under which, in the succeeding impulse of the strip, the partially-folded side laps are moved and thereby turned over to a horizontal position, passing thence beneath an oscillatory pressure plate 84 by means of which the folded laps are pressed hard down upon and thus cemented to the adjacent side portions of the box body.

In the present instance the pressure plate 84 is loosely supported in a recessed head 85 having a pair of forwardly extending arms 86 which are pivoted to brackets on the bed; such plate being maintained yieldingly projected below the head by suitably disposed springs 87 confined in the recess of the head. This head is connected by means of a link 88 with the rocker-lever 77, whereby when said lever is actuated to swing inward the folders 73 the head 85, together with its yielding plate 84, is depressed. It is to be noted that the folding over of the side laps is accomplished during the bodily movement of the strip, and that the action of the pressure plate on the laps is effected when the strip is at rest.

Overhanging the strip in its travel between the vibratory folders 73 is a plate 89 having beveled edges 90 which define the longitudinal folds and thus insure the accurate parallel folding of the laps. The plate is provided at one end with an angular portion 91 by means of which it is conveniently affixed to the basal flange of the cap 72. The underside of the plate 89 is provided with parallel longitudinal grooves 92 which are suitably-spaced to permit the unobstructed passage of the lines of glue on the upper surface of the strip.

The strip, with its two-ply sides, is advanced to and between intermittently acting feeding and scoring rolls 93, the upper of which is provided with spaced peripheral ribs 94 by means of which the transverse score lines $j$, $k$, are formed in the strip.

The two sets of feeding and scoring rollers 57, 93 are actuated concurrently so as to feed the desired length of paper at the proper time with uniformity, the actuating mechanism herein shown for the respective pairs of rollers being similar to the mechanism disclosed in Patent No. 554,975 aforesaid. Briefly described the shafts of each pair of rollers are provided at one end with intermeshing gear wheels 95, the lower of which has secured thereto a ratchet 96. On the lower shaft is also loosely mounted a disk 97 bearing on its inner side a pawl 98 adapted to co-act with the teeth of the ratchet. Secured to the face of the disk 97 is a crank disk 99 which is connected by means of a rod 100 with one of the gear wheels of the gear train. In the present instance the rod 100 for the first pair of rollers is connected with a wrist pin on the gear 82 and the rod for the second pair of rollers is connected with the gear wheel 101 in mesh with the main gear 47. During the rotation of the gears 82, 101 the crank rods oscillate their respective disks 99 and, perforce, the pawls 98 on the latter, which pawls impel their complementary ratchets step-by-step, and the latter, in turn, transmit the intermittent movement through the associated gearing to the feeding and scoring rollers.

The leading end of the strip is advanced by the rollers 93 through a guide throat formed between spaced plates 102 on a die block presently described, to coördinated blank cutting and forming mechanisms. (See Figs. 11 and 23.)

The cutting mechanism includes a vertically reciprocating transverse knife 103 which severs the blank lengths (Fig. 2) successively from the strip. This knife is carried by a vertically-reciprocating cross-head 104 which is connected by means of a link 105 with the rocker-lever 67. The severed blank is supported upon spaced parallel ledges formed upon the die block 106 shown in perspective in Fig. 20. Through the body of the block is a rectangular opening corresponding in width and length with those of the completed box, which opening is in vertical alinement with a former 107 carried by a vertically-reciprocating frame 108. The depending side members of this frame are provided with rollers 109 which run in the races of cams 110 on the main shaft; the contour of the cam races being such that when the blanks are imposed over the opening of the die block the former 107 is caused to descend a short distance so as to force the blank down into the opening and thus cause the two reinforced side portions of the blank to be folded up to form the sides of the box.

Two oppositely-disposed pairs of horizontal fingers 111 are slidingly fitted to guide slots in the top of the block so as to reciprocate toward and from the respective slitted ends of the bent-up sides of the blank, such fingers in their inward movement toward each other folding the ends, together with the corner tongues, inward at right angles or substantially so to the sides, as clearly shown in Figs. 21 and 22. These fingers are carried by spaced slides 112 having anti-friction rollers 113 which embrace appropriate cams 114 on the main shaft.

The die-block is provided with depending sides 115 which embrace a bearing plate 116 supported on and extending longitudinally of the bed. On this plate is supported the horizontal run of a chain of hollow-links 117 which is intermittently impelled by a reciprocating gravity dog 118 (Figs. 8 and 10) which enters the successive links and advances them consecutively beneath the die opening. This dog is pivoted to a slide-block 119 having anti-friction rollers 120 which embrace an appropriate cam 121 on the main shaft. As each link is brought under the die opening the former 107 is further depressed, thus forcing the blank down through the opening and into the link and perforce, folding up the ends (m) of the blank, as indicated by the dotted lines in Fig. 23. The partially-completed box thus supported in the link is in the condition illustrated in Fig. 5; the upright end parts m extending above the link. The cams 110 then operate to raise the former-bearing frame and its former 107 to their original position, the partially-formed box remaining in the chain link.

Slidingly mounted in horizontal dove-tail guide-ways on the underside of the die block, so as to be movable toward and from the die-opening directly above the side walls of the under-lying chain link, are so-called stripper bars 122. These bars are maintained normally positioned with their inner ends overhanging the link walls, by means of depending spaced spring-plates 123, 124 which are secured to standards 60. The lower end of the plate 124 is provided with an angular bevel edged extension 125 which overhangs the path of the chain for a purpose below described. The upper portions of the inner ends of the bars 122 are beveled, as at 126, so as to facilitate the outward movement of the bars by and during the descent of the former 107 while entering the box-blank into the die-opening. When the former in its ascent passes above the ends of the bars the latter, being unobstructed, are moved yieldingly inward by the action of the springs in a manner to overhang the side walls of the partially-formed box in the link and thus prevent upward movement of the box with the former 107.

The chain with the partially-formed box therein is advanced step-by-step, the upwardly extending laps m passing through appropriate slots 127 in the die-block. As the chain progresses the laps m approach and impinge respectively against spaced cam pieces 128 (as indicated by the dotted lines in Fig. 25) and are thereby cammed over to the horizontal position shown in the same figure and also in Fig. 6. These cam-pieces comprise beveled portions projecting from the ends of horizontal members 129 which are affixed to the upper portions of upstanding flat-spring plates 130 that are secured at their lower ends to spaced bars 131 on the bearing plate 116. The cam-pieces gradually deflect the advancing end laps inwardly and along the score lines j to a horizontal position, or substantially so, the beveled edges of the spring plate extension 125 being in close relation to such score lines and thus presenting horizontal bearing edges which insure the accurate bending of the laps. As the laps are being folded inwardly their bent edges pass under the horizontal cam members 129, the chain link with the thus partially-formed box halting in the space between the spring-plates 130. Thereupon the laps m are forced down into the interior of the box and pressed against the inner end walls thereof, so as to complete the box.

The final holding and pressing operation is accomplished by vertically-reciprocative plunger mechanism which is actuated concurrently with the former 107. This mechanism is clearly shown in Figs. 12, 24, 26 and 27, of the drawings, referring to which 132 designates a vertical guide head which is affixed to the frame work so as to overhang the path of the chain link embraced by the spring-plates 130; and 133 designates a plunger body vertically guided in the head. This body is secured to the lower end of a screw-rod 134 which extends slidingly through and above an orifice in an overhanging bracket 135 which is affixed to the former-bearing frame 108. The upper end of the rod is provided with nuts 136 which constitute a vertically adjustable stop. Seated in a socket 137 in the upper end of the plunger body is a cushion spring 138 which encircles the rod, but terminates short of the bracket, so as afford slight lost motion for a purpose presently appearing. Affixed to the sides of the plunger body are depending spring plates 139 to the lower ends of which are secured blocks 140. These blocks are held normally in contact with each other by the spring plates yet may be spread apart or expanded. The inner faces of the blocks are oppositely recessed to receive a wedge-like cam 141 which is formed on the lower end of a stem 142. This stem rises through a guide opening formed in and between the contiguous faces of the blocks and enters a central guide orifice in the plunger body. A spring 143 encircling the stem and bearing against the plunger body and a collar 144 on the stem tends to maintain the stem and its cam normally depressed in which position the head is below the bottom of the blocks.

By the construction just described the bracket 135, in its movement concurrently with the former-bearing frame, vertically reciprocates the plunger 133, acting in the down-stroke upon the plunger through the cushioning spring 138, and in the up-stroke acting against the opposing stop on the rod 134. In the initial down stroke of the plunger the blocks 140 are in contact with each other, so that they and the lateral spring plates 139 freely enter the underlying box in the chain and the wedge-shaped cam 141 contacts with and is stopped by the bottom of the box. As the plunger blocks approach the box they contact with and spread apart the yieldingly supported cam bars 129 which overhang the edges of the partly folded laps. Thereupon the blocks impinge against the laps and force them downward and toward the respective ends of the box. In the continued descent of the plunger the blocks 140 are spread outwardly by the action of the opposing inclines of the cam 141 in opposition to the action of the spring 143, and the plates 139 are thus forced against the inturned end laps of the box in a manner to insure their intimate contact and close union with the ends of the box. This completes the formation of the box.

In the upward movement of the plunger 133, after it clears the box, the spring 143, expanding, depresses the cam 141 and permits the spring plates 139 and blocks 140 to resume their normal condition.

To insure the proper positioning of the plunger in respect to the underlying box after the end laps escape the folder cams, less vertical movement of the plunger is required than of the former-bearing frame, and, therefore, to compensate for the relative difference of travel, provision is had for lost-motion between the bracket 135 and the cushion spring 138 of the plunger, as above described. When the plunger is at the limit of its upward stroke the base of the cam 141 is immediately above the path of the horizontally in-turned laps, so that such laps in their forward travel from the lateral cam-pieces 128, pass under such cam 141 and are thereby effectually prevented from springing upward out of horizontal position before the down stroke of the plunger.

The reinforced boxes, formed in succeeding links of the chain as above-described, are carried throughout almost the entire circuit of the intermittently moving chain, in order to insure the drying and hardening of the glue, whereupon the boxes are successively discharged from the chain by an ejecting plunger substantially as described in Patent No. 554,975 hereinbefore referred to.

It is to be understood that our invention is not limited to the details of construction herein disclosed, as the same may be varied within the principle of our invention and the scope of the appended claims.

We claim—

1. In a box-making machine, the combination with strip-feeding mechanism, of means for producing spaced-apart recesses in the respective edges of the strip to provide longitudinal side laps integral with the body of the strip, means for folding said laps upon the adjacent parts of the strip body to provide reinforced side portions, and means for transversely severing the strip between succeeding reinforced portions.

2. In a box-making machine, the combination with strip-feeding mechanism, and means for applying glue to the surface of the strip at predetermined intervals adjacent the longitudinal edges of the strip, of means for producing spaced-apart recesses in the respective edges of the strip to form longitudinal side laps integral with the body of the strip, movable folders for partially folding the laps inward, stationary members for completing the folding of the laps upon the adjacent portions of the strip, a pressure device for acting upon the folded laps, and means for transversely severing the strip between succeeding reinforced portions.

3. In a box-making machine, the combination with strip-feeding mechanism, and means for applying glue to the strip at predetermined intervals, of punch mechanism comprising means for longitudinally slitting the body of the strip at regular intervals and means for producing spaced-apart recesses in the respective edges of the strip, said recesses providing longitudinal side laps integral with the body of the strip, means for folding said laps upon the adjacent parts of the strip to provide reinforced side portions, and means for transversely severing the strip between the succeeding reinforced portions and across the longitudinally-slitted portions.

4. In a box-making machine, the combination with strip-feeding mechanism, and means for applying glue to the strip at predetermined intervals, of punch mechanism comprising means for longitudinally slitting the body of the strip at regular intervals and means for producing spaced-apart recesses in the respective edges of the strip, said recesses providing longitudinal side laps integral with the body of the strip, means for folding said laps upon the adjacent parts of the strip to provide reinforced side portions, means for transversely severing the strip between the succeeding reinforced portions and across the longitudinally-slitted portions so as to produce box blanks each having two-ply side portions, single-ply end extensions from the side portions, and single-ply end extensions from the body of the strip, said latter extensions in length exceeding the width of the end extensions of the side portions.

5. In a box-making machine, the combination with strip-feeding mechanism, and means for applying glue to the strip at predetermined intervals, of punch mechanism comprising means for longitudinally slitting the body of the strip at regular intervals and means for producing spaced-apart recesses in the respective edges of the strip, said recesses having offset corners and providing longitudinal side laps with corner tongues integral with the body of the strip, means for folding said laps upon the adjacent portions of the strip to provide reinforced side portions, means for transversely severing the strip between the succeeding reinforced portions and across the longitudinally-slitted portions so as to provide box-blanks each having two-ply side and corner portions, single-ply end-extensions from the latter, and single-ply end extensions from the body of the strip.

6. In a box-making machine, the combination with strip-feeding mechanism, and means for applying glue to the strip at predetermined intervals, of punch mechanism including means for longitudinally slitting the body of the strip at regular intervals and means for producing spaced-apart recesses in the respective edges of the strip, said recesses having offset corners and providing longitudinal side laps with corner tongues integral with the body of the strip, means for folding said laps upon the adjacent portions of the strip to provide reinforced side portions, means for transversely severing the strip between the succeeding reinforced portions and across the longitudinally-slitted portions so as to provide box-blanks each having two-ply side and corner portions, single-ply end-extensions from the latter, and single-ply end extensions from the body of the strip, said latter extensions in length exceeding the width of the end extensions of the side portions.

7. The combination of a pair of strip-feeding rollers having means for longitudinally scoring a strip of box material, means for intermittently actuating said rollers, punch mechanism for longitudinally slitting the body of the strip at regular intervals and for producing spaced-apart recesses in the respective edges of the strip, said recesses providing longitudinal side laps integral with the body of the strip, means for folding said laps upon the adjacent parts of the strip to provide reinforced side portions, a second pair of strip-feeding rollers having means for scoring the strip transversely at predetermined intervals, and means for transversely severing the strip between the succeeding reinforced portions and across the longitudinally-slitted portions so as to produce box-blanks.

8. The combination of a pair of strip-feeding rollers having means for longitudinally scoring a strip of box material, punch mechanism for longitudinally slitting the body of the strip at regular intervals and for producing spaced-apart recesses in the respective edges of the strip, said recesses providing longitudinal side laps integral with the body of the strip, means for folding said laps upon the adjacent parts of the strip to provide reinforced side portions, a second pair of strip-feeding rollers having means for scoring the strip transversely at predetermined intervals, means for transversely severing the strip between the succeeding reinforced portions and across the longitudinally-slitted portions, so as to produce box-blanks, and means for converting the succeeding blanks into boxes having reinforced end and sides, 9. In a box-making machine, the combination with strip-feeding mechanism, mechanism for forming pairs of parallel slits in spaced relation to each other longitudinally of the strip, and means for severing the leading end of the strip across the succeeding pairs of slits, whereby box-blanks are produced, each comprising a body having side portions, end extensions from the side portions, and end extensions from the body, of a die block having an opening therein above which the leading end of the strip is positioned preparatory to the severence of a box-blank therefrom, spaced pairs of fingers reciprocative transversely of the die opening, means for actuating said fingers, a box conveyer movable beneath said opening, means for actuating said conveyer, a reciprocative former co-acting with said die block to introduce the superposed box blank thereinto and thence to the conveyer, and means for actuating said former, the relative movements of the said former and fingers being such that the side portions of the blank and their end extensions are bent upward in the die block, the up-standing end extensions of the side portions are then bent inward in said block, and the end extensions of the body are then bent upward as the blank passes through the opening of the die block and enters the box conveyer, said die block having therein parallel ways for the passage of the up-standing ends of the blank when it is entered in the conveyer.

10. In a box-making machine, the combination with strip-feeding mechanism, mechanism for forming pairs of parallel slits in spaced relation to each other longitudinally of the strip, and means for severing the leading end of the strip across the succeeding pairs of slits whereby box-blanks are produced, each comprising a body having side portions, end extensions from the side portion, and end extensions from the body, of a box conveyer, means for actuating said conveyer, and means for folding the blank into box form and introducing it to the conveyer so that the end extensions of the blank project above the conveyer, and a pair of spaced folder cams for acting upon the upper portions of the upstanding end extensions, said cams comprising spaced beveled members between and against which such portions are moved and thereby simultaneously deflected inwardly toward each other.

11. In a box-making machine, the combination with strip-feeding mechanism, mechanism for forming pairs of parallel slits in spaced relation to each other longitudinally of the strip, and means for severing the leading end of the strip across the succeeding pairs of slits, whereby box-blanks are produced each comprising a body having side portions, and extensions from the side portions, and end extensions from the body, of a box conveyer, means for actuating said conveyer, and means for folding the blank into box form and introducing it to the conveyer so that the end extensions of the blank project above the conveyer, a pair of spaced folder cams for acting upon the upper portions of the upstanding end extensions, said cams comprising spaced beveled members between and against which such portions are moved and thereby simultaneously deflected inwardly toward each other, and parallel members arranged to over-hang the thus bent end portions as the latter progress.

12. In a box-making machine, the combination with strip-feeding mechanism, mechanism for forming pairs of parallel slits in spaced relation to each other longitudinally of the strip, and means for severing the leading end of the strip across the succeeding pairs of slits, whereby box-blanks are produced, each comprising a body having side portions, end extensions from the side portions, and end extensions from the body, of a box conveyer, means for actuating said conveyer, means for folding the blank into box form and introducing it to the conveyer so that the end extensions of the blank project above the conveyer, a pair of spaced folder cams for acting upon the upper portions of the upstanding end extensions, said cams comprising spaced beveled members between and against which such portions are moved and thereby simultaneously deflected inwardly toward each other, and a horizontal guide plate supported above the horizontal path of the conveyer directly in advance of the said cams, so as to present parallel bearing edges to the said end portions as they are being turned inward by the cams.

13. In a box-making machine, the combination with strip-feeding mechanism, mechanism for forming pairs of parallel slits in spaced relation to each other longitudinally of the strip, and means for severing the leading end of the strip across the succeeding pairs of slits, whereby box-blanks are produced, each comprising a body having side portions, end extensions from the side portions, and end extensions from the body, of a box conveyer, means for actuating said conveyer, means for folding the blank into box form and introducing it to the conveyer so that the end extensions of the blank project above the conveyer, a pair of spaced folder cams for acting upon the upper portions of the upstanding end extensions, said cams comprising spaced beveled members between and against which such portions are moved and thereby simultaneously deflected inwardly toward each other, parallel members arranged to overhang the thus bent end portions as the latter progress, a plunger reciprocable between the said members and adapted to fold down the said end portions and means for reciprocating said plunger.

14. In a box-making machine, the combination with strip-feeding mechanism, mechanism for forming pairs of parallel slits in spaced relation to each other longitudinally of the strip, and means for severing the leading end of the strip across the succeeding pairs of slits, whereby box-blanks are produced, each comprising a body having side portions, end extensions from the side portions, and end extensions from the body, of a box conveyer, means for actuating said conveyer, means for folding the blank into box form and introducing it to the conveyer so that the end extensions of the blank project above the conveyer, a pair of spaced folder cams for acting upon the upper portions of the upstanding end extensions, said cams comprising spaced beveled members between and against which such portions are moved and thereby simultaneously deflected inwardly toward each other, parallel members arranged to overhang the thus bent end portions as the latter progress, a plunger reciprocable between the said members and having an expansible foot portion adapted to fold down the said end portions and enter into and recede from the box, means for reciprocating said plunger, and means whereby the said foot portion is expanded and retracted within the box.

15. In a box-making machine, the combination with strip-feeding mechanism, mechanism for forming pairs of parallel slits in spaced relation to each other longitudinally of the strip, and means for severing the leading end of the strip across the succeeding pairs of slits, whereby box-blanks are produced, each comprising a body having side portions, end extensions from the side portions, and end extensions from the body, of a box conveyer, means for actuating said conveyer, means for folding the blank into box form and introducing it to the conveyer so that the end extensions of the blank project above the conveyer, a pair of spaced folder cams for acting upon the upper portions of the upstanding end extensions, said cams comprising spaced beveled members between and against which such portions are moved and thereby simultaneously deflected inwardly toward each other, parallel members arranged to overhang the thus bent end portions as the latter progress, a plunger reciprocable between the said members and adapted to fold down the said end portions, and means for reciprocating said plunger, said plunger comprising a body, depending spring plates thereon, blocks carried by the free ends of the plates, a cam member slidingly mounted between said blocks, and a spring arranged to maintain said cam member normally below the blocks.

Signed at Barberton in the county of Summit and State of Ohio this 23rd day of June A. D. 1917.

JACOB P. WRIGHT.
CARL A. CARLSON.